Sept. 21, 1943.  H. K. TIX  2,330,160
AUTOMATIC CLUTCH
Filed Feb. 2, 1942  2 Sheets-Sheet 1

Inventor,
Henry K. Tix,
By Frank S. Ashleman
Attorney,

Patented Sept. 21, 1943

2,330,160

UNITED STATES PATENT OFFICE 2,330,160

AUTOMATIC CLUTCH

Henry K. Tix, Galveston, Tex.

Application February 2, 1942, Serial No. 429,324

3 Claims. (Cl. 192—105)

This invention relates to clutches especially designed for use in transmitting power from a source of power such as an electric motor, gas engine, steam engine or motor, to a driven object or member whereby the driven member may be gradually set in motion after one of the aforesaid types of motors, hereinafter to be termed the "prime mover," has gained a certain R. P. M., thus preventing the stalling of the prime mover, for the clutch can be so regulated that it will not act to move the load until the prime mover has been sufficiently accelerated.

It is a further object of this invention to provide a clutch of the character indicated which is automatic in character, in that it will clutch upon the prime mover having a certain R. P. M. and will de-clutch automatically if the R. P. M. of the prime mover is reduced to a degree where the prime mover would be subjected to strain if the connection between the prime mover and the load was continued.

An object of the invention therefore is to provide a clutch having a driving member effective to operate clutch elements with relation to a clutch housing or drum, which clutch housing would be associated with gearing or connections to the driven member for transmitting power from a shaft driven by the prime mover to the said housing, and the parts associated therewith may be connected to the load and by the term "load" it is to be understood that reference is made to any element or elements that are driven, such as an automobile, motor cycle or, in fact, any mechanism that is to be driven.

It is a further object of this invention to provide a clutch of the character indicated which, as before stated, is automatic in character for clutching or de-clutching and operated at predetermined speeds according to the tensioning means employed in retaining the mechanism under control through the employment of springs or the like.

It is a still further object of the invention to provide a clutch of the character indicated which comprises comparatively few inexpensive parts which are efficient and satisfactory in use and inexpensive to produce and maintain.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1:
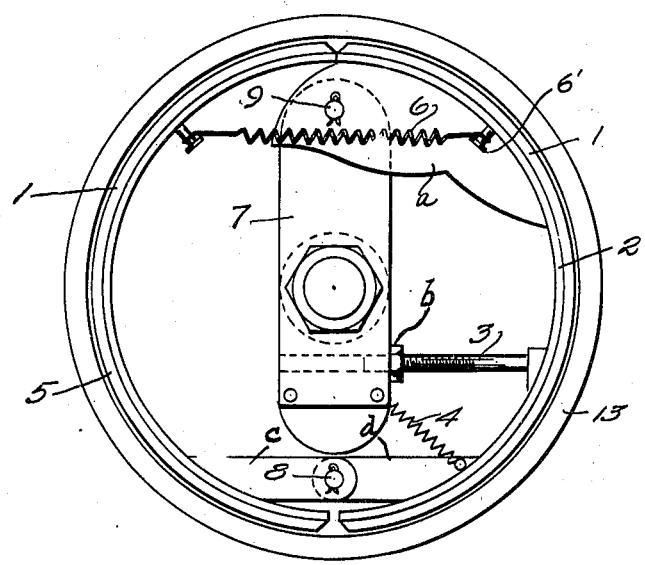
Figure 1 illustrates a view in elevation of a clutch housing with the clutch members installed therein.
Figure 2:
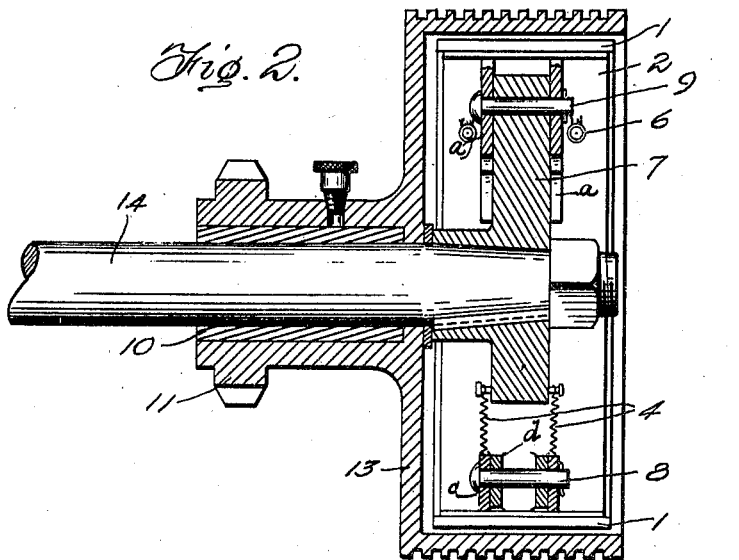
Figure 2 illustrates a central sectional view thereof.

In these drawings 1 denotes a clutch lining, 2 a secondary shoe, 3 an adjusting screw, 4 a secondary spring, 5 a primary shoe, and 6 a cross spring for exerting a pull on the shoes.

The secondary shoe 2, in the present embodiment of the invention, is provided with two apertured cheek pieces $a$ holding a pin 9 on which a driving dog 7 is installed, the said dog being secured on a driving shaft 14 operated by a prime mover (not shown), but which may be of the character of those heretofore mentioned or otherwise, and the secondary shoe 2 is under tension of the spring 6, to which reference has been made, that is connected to the secondary shoe through the use of studs 6' or the like. The adjusting screw 3 is threaded in one edge of the dog and is retained at different positions of adjustment by a jamb nut $b$ and it may be set to regulate the tension of the secondary spring 4, one of which is on each edge of the dog. The primary shoe and the secondary shoe are hingedly connected through the employment of the arms $c$ and $d$ attached to the primary and secondary shoes, respectively, which arms overlap and are provided with coinciding apertures to receive the hinge pin 8. The primary and secondary shoes coact with or engage the clutch lining 1 for transmitting the motion of the dog and secondary shoe to the clutch housing and, as shown, the clutch housing has a sleeve into which a bushing 10 is seated and the bushing 10 is interposed between the sleeve of the housing and the shaft as shown in the sectional view. A pulley or sprocket wheel or gearing 11 may be attached externally of the sleeve so that it is driven thereby and it may be connected to any load which is to be driven.

Ordinarily the assembly shown in Figure 1 is arranged to be driven clockwise, although the assembly may be changed to drive the clutch housing in an anti-clockwise direction by removing the pin 9 and reversing the shoes. Cooling fins 12 are formed on the periphery of the clutch housing 13.

In the operation the clutch housing 13 may be applied to a shaft of the prime mover through the employment of the bushing 10 or, as a substitute therefor, conventional types of anti-friction bearings, and is dormant until power is transmitted to the same through the primary shoe 5 and the secondary shoe 2, whereby power is transmitted to the element 11 whether it be a sprocket pulley or gearing that may be attached at any appropriate location externally or internally of the clutch housing and, as stated, power will be transmitted from the element 11 to any appropriate load. Appropriate connections between these separate assembled parts may be employed and these mechanical means may be in the nature of set screws, keys, splines or the like, and need not, it is thought, be illustrated nor described in detail.

It is seen that the dog 7 is driven, and through the pin 9 on which the secondary shoe is pivoted the said shoe moves outwardly and communicates motion to the primary shoe, both of which shoes are lined. As the dog attains the predetermined R. P. M. to which the cross springs 6 are set for the centrifugal force attending its operation, it will cause the primary shoe to come in contact with the clutch housing and as the speed of the dog increases and the spring 4 releases the secondary shoe, the said shoe is caused to come in contact with the clutch housing. The higher the R. P. M. the tighter the clutch will hold and as the dog decreases in R. P. M. the clutch will disengage automatically, due to the action of the primary springs 6, thereby causing a free wheeling of the clutch housing.

Figure 3:
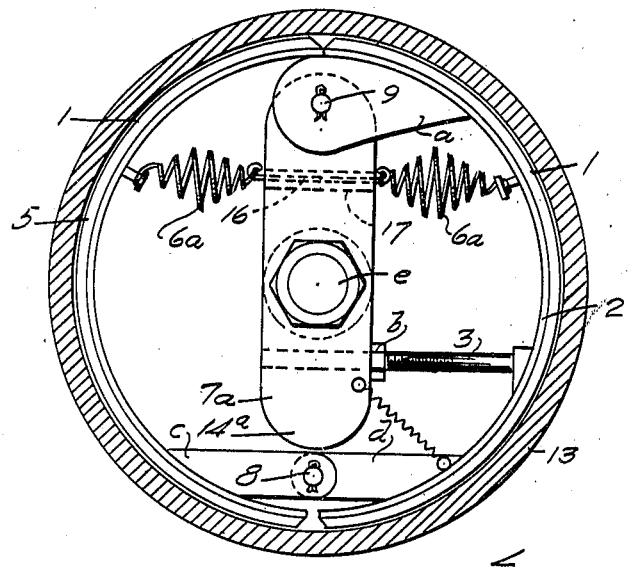
Figure 3 illustrates a sectional view on the line 3—3 of Fig. 4.
Figure 5:
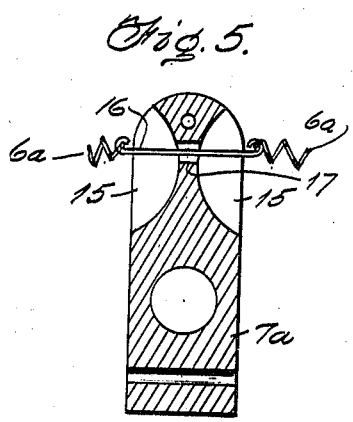
Figure 5 illustrates a detail view of the modified dog.
Figure 4:
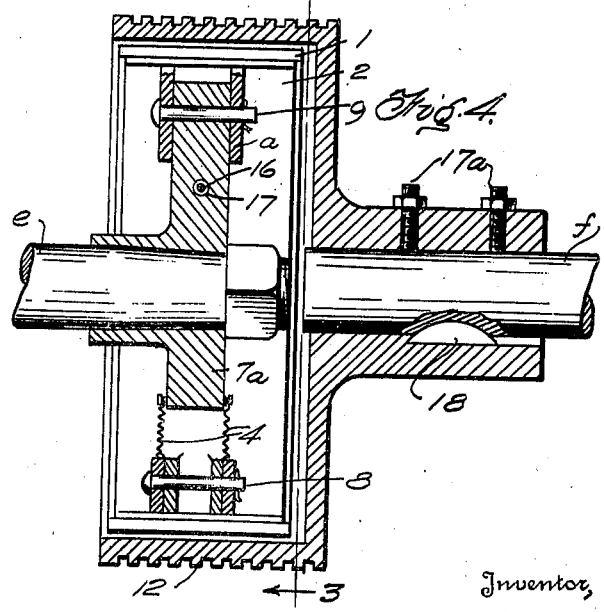
Figure 4 illustrates a sectional view of a clutch applied to a modified driving and driven member.

As seen from an inspection of Figs. 3, 4 and 5, the invention has been modified for use as a clutch between a driving member or shaft and a shaft adapted to be connected to a load. In the modified form, the dog 7a has a changed construction for the purpose of balancing the rotating member so that it will run smoothly. This may be accomplished by providing an extension 14a at one end of the dog on one side of the shaft, or other means may be resorted to such as recessing as at 15, the edges of the dog to remove the weight of metal at such locations. It is obvious that this may be carried on to a degree which will effect a balance on each side of the shaft.

Furthermore, in the modification, Figure 3, the dog is provided with a rod 16 extending through an aperture or channel 17 and springs 6a are connected to the end of the rod and are anchored at their opposite ends to the shoes in the same manner that the spring 6 is anchored to the shoes as shown in Fig. 1. The shoes and their association with the clutch housing in the modification are the same as described in connection with Figure 1, but in the modification the dog is mounted on a shaft e which may be regarded as the prime mover, whereas the clutch housing is mounted on a shaft f to be connected to the load. The clutch housing may be connected to the shaft f by any well known mechanical means such as set screws 11a or by a key 18 of well known type. Thus, it will be seen that power is transmitted from the driving shaft through the clutch to the shaft f and this can be used in any line shaft or other power transmitting means.

The springs employed as associated with the dog could be of such strength as conditions of use warrant and the inventor does not wish to be limited with respect to those features.

I claim:

1. In a clutch, a clutch housing, a driving shaft rotatable in the clutch housing, means for communicating the rotary motion of the shaft to the clutch housing including primary and secondary shoes hinged together at one end and operative to expand into engagement with the interior of the clutch housing under centrifugal force, means for communicating the motion of the shaft to the shoes including a dog mounted on the shaft on which the shoes are pivotally mounted, a spring connected to the end of the dog opposite the end on which the shoes are mounted, said spring being anchored to the secondary shoe, and a member on the housing for transmitting the motion of the housing to a load.

2. In a clutch, a clutch housing, a driving shaft rotatably mounted in the clutch housing, a dog on the shaft within the housing, primary and secondary shoes within the housing, means for pivoting the secondary shoe to the dog, means for pivotally connecting the opposite ends of the shoes, means connected to the dog and one of the shoes for exerting a pull on the shoe, resilient means connecting the shoes for drawing them inwardly against the action of centrifugal force, and a member on the housing for transmitting the motion of the housing to a load.

3. In a clutch, a clutch housing, a driving shaft rotatably mounted in the clutch housing, a dog on the shaft within the housing, primary and secondary shoes pivoted together at one end, means for pivotally mounting the secondary shoe on the dog at the end remote from the ends where the shoes are pivoted together, resilient means connecting the shoes between their ends, and a member on the housing for transmitting the motion of the housing to a load.

HENRY K. TIX.